F. W. FARR.
METHOD OF REPAIRING PNEUMATIC TIRE COVERS.
APPLICATION FILED JUNE 10, 1914.

1,330,855.

Patented Feb. 17, 1920.

Witnesses:
Charles Farr
A. Crisford

Inventor:
Frederick William Farr

UNITED STATES PATENT OFFICE.

FREDERICK WILLIAM FARR, OF NORTHAMPTON, ENGLAND.

METHOD OF REPAIRING PNEUMATIC-TIRE COVERS.

1,330,855.    Specification of Letters Patent.    Patented Feb. 17, 1920.

Application filed June 10, 1914. Serial No. 844,378.

*To all whom it may concern:*

Be it known that I, FREDERICK WILLIAM FARR, a subject of the Emperor of Germany, and resident of Northampton, England, have invented certain new and useful Improvements in Methods of Repairing Pneumatic-Tire Covers, of which the following is a specification.

This invention relates to the repair or reclaiming of worn covers of pneumatic tires, as used on motor cars, cycles and the like.

Hitherto cast-off pneumatic tire covers as used on motor cars, cycles and the like have been reclaimed by cutting the beads off one (generally such as have the beads broken, or burst at the sides) and placing it over another, having good beads, and securing the two together by means of rivets, or sewing, the said rivets or sewing being both on the outer surface, or open to view on the added cover, and also on the surface of casing of under cover. Among the disadvantages of securing them together in this manner may be mentioned the rubbing of the stitches, and the bad effect of the varied weather conditions, on the sewing threads or fastenings, by rotting and the like, besides which the crude method of stitching two covers together one above the other is objectionable to most motorists.

The present invention has for its object the reinforcing or reclaiming of pneumatic tire covers by securing two worn covers together, by means of sewing or stitching without the said stitches being visible on the outside of top or added cover and if preferred on the casing or lining of under cover the result being that the two covers are more flexible and stronger through the protection given besides which, when on the car, they look very near in appearance to a single cover.

Figure 1:
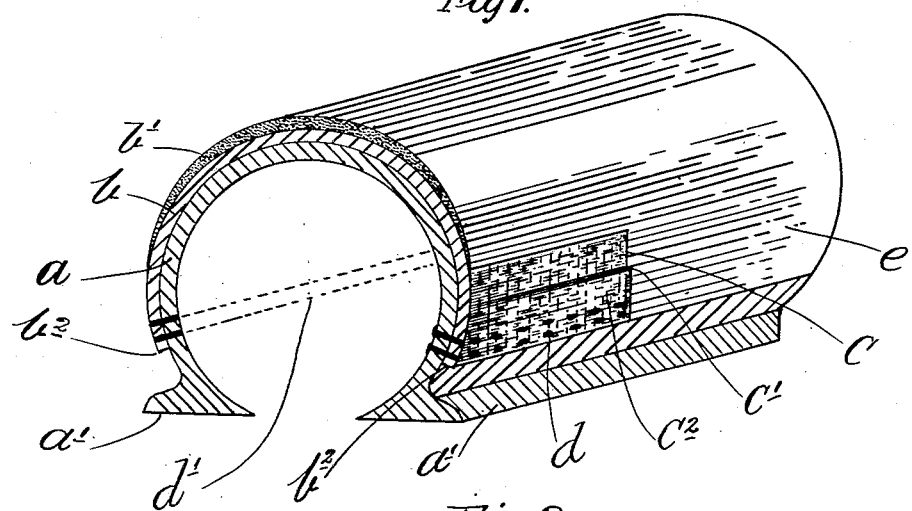

Figure 1, in the accompanying drawings represents a section of two pneumatic tire covers secured together by means of two rows of sewing. $a$ is the bottom cover, with beads $a^1$. $b$ is the top or added cover, $b^1$ is the rubber surface, being part of added cover $b$. $b^2$ the points from which the beads have been removed. $c$ shows top two layers (*i. e.* surface rubber and canvas to which it is adhered) of added cover $b$ separated up to point $c^1$ which is held back to enable the sewing process to be carried out. $c^2$ is the remaining portion of added cover $b$, which has been sewn, and the separated layer or layers $c$ replaced and vulcanized down in their original position, forming a combine invisibly stitched on the outside. $d^1$ shows the stitches visible on the inside of bottom cover.

Figure 2:
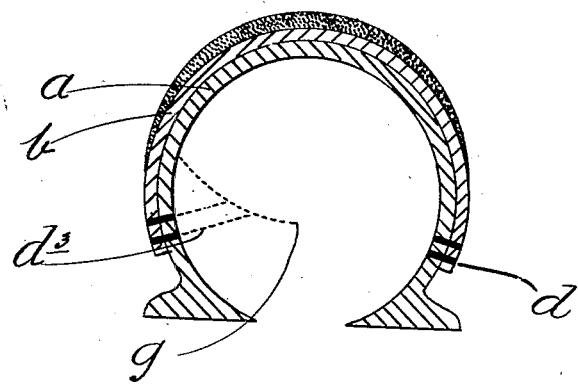

Fig. 2, represents another section of two pneumatic tire covers sewn together. $g$ shows one ply of the casing inside bottom cover, separated and held back in order that the two covers may be secured together by means of sewing as at $d^3$. The separated ply of canvas $g$ is then replaced in its former position by cementing or vulcanizing thus producing invisible stitching inside.

What I claim, is:—

A pneumatic tire comprising two casings each composed of layers of fabric and rubber, said casings being arranged one within the other and stitched together, said stitches extending through the sublayers and being covered and concealed by the surface layers of the casings, said surface layers and stitches being vulcanized in place.

FREDERICK WILLIAM FARR.

Witnesses:
W. GEO. HILL,
F. TAPSCOTT.